(12) United States Patent
Choi et al.

(10) Patent No.: US 9,430,500 B2
(45) Date of Patent: Aug. 30, 2016

(54) METHOD AND DEVICE FOR OPERATING IMAGE IN ELECTRONIC DEVICE

(71) Applicant: Samsung Electronics Co., Ltd., Gyeonggi-do (KR)

(72) Inventors: Hansol Choi, Gyeonggi-do (KR); Hongseok Moon, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/593,910

(22) Filed: Jan. 9, 2015

(65) Prior Publication Data
US 2015/0199385 A1    Jul. 16, 2015

(30) Foreign Application Priority Data

Jan. 10, 2014    (KR) .................. 10-2014-0003412

(51) Int. Cl.
| | | |
|---|---|---|
| G06K 9/54 | (2006.01) |
| G06F 17/30 | (2006.01) |
| H04N 1/00 | (2006.01) |
| G06T 11/60 | (2006.01) |
| G06F 3/048 | (2013.01) |

(52) U.S. Cl.
CPC ......... *G06F 17/30265* (2013.01); *G06F 3/048* (2013.01); *G06F 17/30247* (2013.01); *G06T 11/60* (2013.01); *H04N 1/00411* (2013.01); *H04N 2201/3228* (2013.01)

(58) Field of Classification Search
USPC ............ 382/305, 309, 181, 189; 324/750.22, 324/754.1, 754.26; 348/14.03, 14.16, 348/14.08; 358/1.13, 1.12, 1.15
See application file for complete search history.

(56) References Cited

U.S. PATENT DOCUMENTS

| | | | | |
|---|---|---|---|---|
| 6,753,900 B2 * | 6/2004 | Runcie | .................... | H04N 7/15 348/14.03 |
| 8,830,492 B2 * | 9/2014 | Kobashi | ............ | H04N 1/00206 358/1.12 |

FOREIGN PATENT DOCUMENTS

JP    2001-203895    7/2001

* cited by examiner

*Primary Examiner* — Anh Do

(57) ABSTRACT

Disclosed are a method and device for providing a user-based interactive image by inserting various pieces of image processing information corresponding to a user input into an image in an electronic device. The method includes: displaying an image, identifying image processing information of the image in response to a user input for the image, and outputting feedback through image processing responding to the user input based on the image processing information. The present disclosure can be applied to various other embodiments based on the aforementioned embodiment.

20 Claims, 14 Drawing Sheets

METHOD AND DEVICE FOR OPERATING IMAGE IN ELECTRONIC DEVICE

CROSS-REFERENCE TO RELATED APPLICATIONS AND CLAIM OF PRIORITY

The present application is related to and claims priority from and the benefit under 35 U.S.C. §119(a) of Korean Patent Application No. 10-2014-0003412, filed on Jan. 10, 2014, which is hereby incorporated by reference for all purposes as if fully set forth herein.

TECHNICAL FIELD

The present disclosure relates to a method and device which can insert various pieces of data corresponding to a user input into an image in an electronic device, thereby providing a user-based interactive image.

BACKGROUND

Recently, with the development of digital technology, various electronic devices (e.g., mobile communication terminals, Personal Digital Assistants (PDAs), electronic organizers, smart phones, and tablet Personal Computers (PCs)) which can perform communication and personal information processing have come to market. The electronic devices have reached a mobile convergence stage of encompassing functions of other terminals without being confined to their own unique functions. For example, the electronic devices may be provided with various functions including a call function such as a voice call and a video call, a message transmission/reception function such as a Short Message Service (SMS), a Multimedia Message Service (MMS), and an e-mail, a navigation function, a photography function, a broadcast reproduction function, a media (a video and music) reproduction function, an internet function, a messenger function, and a Social Networking Service (SNS) function.

Images stored in the electronic devices or acquired through web pages by accessing external servers have various image file formats. Examples of an image file format most frequently used as an international standard may include Microsoft Windows Device Independent Bitmap (BMP), Graphics Interchange Format (GIF), Joint Photographic Experts Group (JPEG), Tagged Image File Format (TIFF), Portable Network Graphics (PNG), and Windows Meta File (WMF).

In addition, the electronic devices have recently supported Exchangeable Image File Format (EXIF) which can be used in various image file formats. Various pieces of EXIF data (or metadata) can be stored in an image file through the EXIF. The EXIF data may include detailed additional information, such as copyright information, a camera maker, a camera model, an image editor, an EXIF version, date and time an image (photograph) is corrected, shoot date and time, an actual size of an image (photograph) uploaded to the web, exposure time (shutter speed), a exposure program, a focal length of a lens, an open-aperture F number, and use or nonuse of a flash, and various pieces of additional information may be automatically recorded when an image is created (captured).

SUMMARY

A method of inserting EXIF data into an image in an electronic device may be automatically recorded when the image is created in the electronic device or external servers or other electronic devices. Therefore, the corresponding EXIF data inserted into the image can be identified through the electronic device, and yet a user cannot add new EXIF data to the image. In addition, the EXIF data inserted into the image does not provide any interaction for user inputs (e.g., various touch-based user inputs) on the image.

To address the above-discussed deficiencies, it is a primary object to provide a method and device for operating an image in an electronic device which can add EXIF data corresponding to a user input to an image and support various feedback outputs (visual, auditory, and tactile feedback outputs) corresponding to the EXIF data in response to the user input.

In the embodiments of the present disclosure, an electronic device may include all devices using one or more of an Application Processor (AP), a Graphic Processing unit (GPU), and a Central Processing Unit (CPU), such as all information and communication devices, multimedia devices, wearable devices, and application devices thereof, which support functions according to the various embodiments of the present disclosure.

An aspect of the present disclosure is to provide a method and device for operating an image in an electronic device which can create an image responding to various user inputs.

Another aspect of the present disclosure is to provide an electronic device and an operating method thereof which can implement an optimal environment for operating a user-based image in an electronic device, thereby enhancing user convenience and usability of the electronic device.

In accordance with one aspect of the present disclosure, a method of providing an image is provided. The method includes: displaying an image; identifying image processing information of the image in response to a user input for the image; and outputting feedback through image processing responding to the user input, based on the image processing information.

In accordance with another aspect of the present disclosure, a method of providing an image is provided. The method includes: recording user-based image processing information responding to a user input in an image; detecting a user input while the image is being displayed; identifying the image processing information in response to the user input; determining whether the user input is an effective input, with reference to the image processing information; and outputting feedback through image processing responding to the user input, based on the image processing information, when it is determined that the user input is the effective input.

In accordance with another aspect of the present disclosure, a computer readable recording medium in which programs for executing the method in a processor are recorded is provided.

In accordance with another aspect of the present disclosure, a computer-readable recording medium is provided in which a program is recorded for executing an operation of acquiring an image, an operation of recording image processing information in the image, an operation of acquiring the image processing information for processing the image, and an operation of outputting related feedback by processing the image based on the image processing information.

In accordance with another aspect of the present disclosure, an electronic device includes: a display unit displaying an image; a touch detecting unit receiving a user input; a storage unit storing the image; and a controller making a control such that image processing information is recorded in the image, the image processing information for processing the image is acquired in response to the user input for the image, and related feedback is output by processing the image based on the image processing information.

In accordance with another aspect of the present disclosure, an electronic device includes: a display unit displaying an image; a touch detecting unit receiving a user input; a storage unit storing the image and one or more programs; and one or more processors controlling image processing according to image processing information by executing the one or more programs, wherein the one or more programs include a program for executing an operation of displaying an image, an operation of identifying image processing information of the image in response to a user input for the image, and an operation of outputting feedback through image processing responding to the user input, based on the image processing information.

In the above mentioned aspects, the features and technical merits according to embodiments of the present disclosure are slightly widely summarized in order that those skilled in the art may understand the present disclosure through the following detailed description of the present disclosure. Besides these features and advantages, the additional features and advantages of the present disclosure constituting the subject matter of the present disclosure described in the claims will be easily understood through the following detailed description of the present disclosure.

As described above, the present disclosure provides a method and device for operating an image in an electronic device which can create and store an image responding to various user inputs. According to the embodiments of the present disclosure, a user can insert EXIF data capable of providing particular feedback in response to a user input (e.g., various touch-based user inputs) into an image using an electronic device. In addition, according to the embodiments of the present disclosure, through EXIF data responding to a user input, the user can be provided with various feedback outputs (visual, auditory, and tactile feedback outputs) corresponding to the EXIF data in response to the user input.

Therefore, according to the embodiments of the present disclosure, an optimal environment can be implemented for operating an image responding to a user input in an electronic device, thereby enhancing user convenience and usability, convenience, accessibility, and competitiveness of the electronic device. The present disclosure can be implemented by all types of electronic devices, such as mobile communication terminals, smart phones, tablet PCs, portable game terminals, Portable Multimedia Players (PMPs), Personal Digital Assistants (PDAs), and wearable devices, and various devices that can support the image operating functions according to the various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
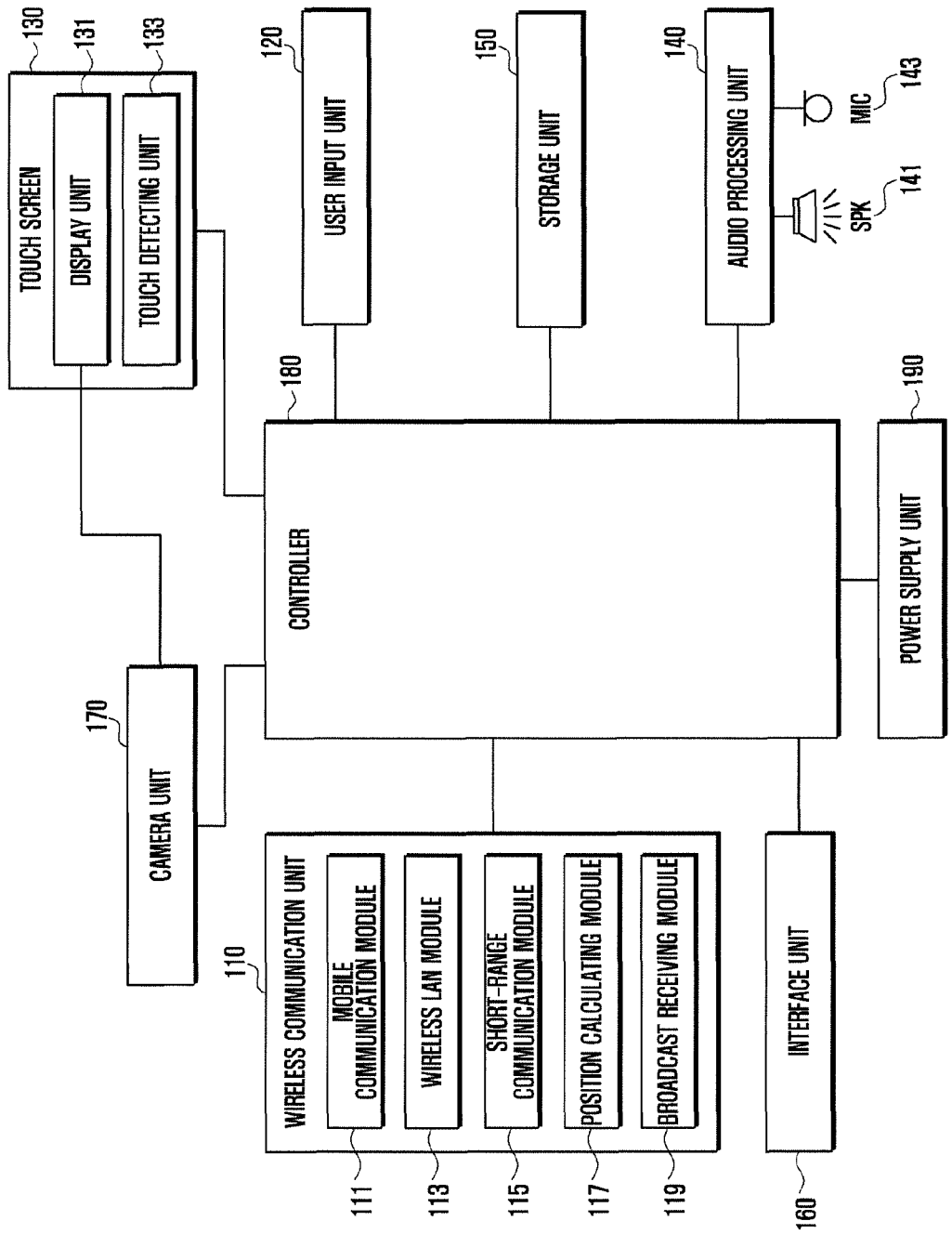
FIG. 1 is a schematic block diagram of an electronic device according to an embodiment of the present disclosure.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. Hereinafter, various embodiments of the present disclosure will be described with reference to the accompanying drawings. It should be noted that the same elements will be possibly designated by the same or similar reference numerals in the drawings. Further, a detailed description of a known function and configuration which may make the subject matter of the present disclosure unclear will be omitted. Hereinafter, it should be noted that only the descriptions will be provided that may help understanding the operations provided in association with the various embodiments of the present disclosure, and other descriptions will be omitted to avoid making the subject matter of the present disclosure rather unclear.

Configurations of an electronic device according to an embodiment of the present disclosure and an operating method thereof will be described with reference to the accompanying drawings. The configurations of the electronic device according to the embodiment of the present disclosure and the operating method thereof are not restricted by or limited to contents which will be described below and therefore, it should be noted that they may be applied to various embodiments based on the following embodiments. In the following embodiments of the present disclosure, a hardware access method will be described as an example. However, the present disclosure includes technology using both hardware and software, and therefore a software-based access method is not excluded in the present disclosure.

In the embodiment of the present disclosure, the electronic device may be applied to all information and communication devices, multimedia devices, and applications thereof, such as tablet Personal Computers (PCs), mobile communication terminals, mobile phones, video phones, Personal Digital Assistants (PDAs), Portable Multimedia Players (PMPs), e-book readers, smart phones, desktop PCs, laptop PCs, netbook computers, MP3 players, cameras, wearable devices (e.g., Head-Mounted Devices (HMDs)), such as electronic glasses, electronic clothing, electronic bracelets, electronic necklaces, electronic appcessories, electronic tattoos, and smart watches), digital broadcasting terminals, and Automated Teller Machines (ATMs).

According to some embodiments, the electronic device may be a smart home appliance having a communication function. For example, the smart home appliance may include at least one of a television, a Digital Video Disk (DVD) player, an audio, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic photo frame.

According to some embodiments, the electronic device may include at least one of various types of medical devices (e.g., Magnetic Resonance Angiography (MRA), Magnetic Resonance Imaging (MRI), Computed Tomography (CT), a scanning machine, and ultrasonic wave device), a navigation device, a Global Positioning System (GPS) receiver, an Event Data Recorder (EDR), a Flight Data Recorder (FDR), a car infotainment device, electronic equipment for a ship (e.g., navigation equipment for a ship and a gyro compass), avionics, a security device, and an industrial or home robot.

According to some embodiments, the electronic device may include at least one of a part of furniture or a building/structure having a communication function, an electronic board, an electronic signature receiving device, a projector, and various kinds of measuring instruments (e.g., a water meter, an electric meter, a gas meter, and a radio wave meter). The electronic device according to the embodiment of the present disclosure may be a combination of one or more of the aforementioned various devices. Furthermore, it is clear to those skilled in the art that the electronic device according to the present disclosure is not limited to the aforementioned devices.

FIG. 1 is a schematic block diagram of an electronic device according to an embodiment of the present disclosure.

Referring to FIG. 1, the electronic device according to the embodiment of the present disclosure can include a wireless communication unit 110, a user input unit 120, a touch screen 130, an audio processing unit 140, a storage unit 150, an interface unit 160, a camera module 170, a controller 180, and a power supply unit 190. In the embodiment of the present disclosure, the electronic device does not necessarily have the elements illustrated in FIG. 1 and can be implemented to have more elements or fewer elements.

The wireless communication unit 110 can include one or more modules making possible wireless communication between the electronic device and a wireless communication system or between the electronic device and other electronic devices. For example, the wireless communication unit 110 can include a mobile communication module 111, a wireless Local Area Network (LAN) module 113, a short-range communication module 115, a position calculating module 117, and a broadcast receiving module 119.

The mobile communication module 111 can transmit/receive a wireless signal to/from at least one of a base station, an external mobile station, and various servers (e.g., an integration server, a provider server, a content server, an internet server, and a cloud server) on a mobile communication network. The wireless signal can include a voice call signal, video call signal, and various forms of data according to transmission and reception of text/multimedia messages.

The mobile communication module 111 can receive one or more images. According to one embodiment, the mobile communication module 111 can acquire an image from at least one of other electronic devices and servers connected to the electronic device through a network (e.g., mobile communication). The mobile communication module 111 can transmit/receive various pieces of image processing information (e.g., exchangeable image file format (EXIF) data or metadata), required for operating images of the electronic device according to the embodiment of the present disclosure, to/from the outside (e.g., servers and other electronic devices) in response to a user request.

The wireless LAN module 113 can be a module for establishing wireless internet access and a wireless LAN link with other electronic devices. The wireless LAN module 113 can be embedded into the electronic device or external to the electronic device. Examples of wireless internet technology can include wireless LAN (Wi-Fi), Wireless broadband (Wibro), World Interoperability for Microwave Access (Wimax), and High Speed Downlink Packet Access (HSDPA).

The wireless LAN module 113 can transmit/receive one or more images selected by a user to/from the outside. According to one embodiment, the wireless LAN module 113 can acquire an image from at least one of other electronic devices and servers connected to the electronic device through a network (e.g., wireless Internet). The wireless LAN module 113 can transmit/receive various pieces of data (e.g., images and image processing information), required for operating images of the electronic device according to the embodiment of the present disclosure, to/from the outside (e.g., servers) in response to a user request. In addition, the wireless LAN module 113 can transmit or receive various pieces of data (e.g., images and image processing information) according to a user's selection to/from other electronic devices when establishing wireless LAN links with the other electronic devices. The wireless LAN module 113 can always be maintained in a turned-on status or turned on according to a user's settings or input.

The short-range communication module 115 can be a module for performing short-range communication. Examples of short-range communication technology can include Bluetooth, Bluetooth Low Energy (BLE), Radio Frequency Identification (RFID), Infrared Data Association (IrDA), Ultra Wideband (UWB), ZigBee, and Near Field Communication (NFC).

The short-range communication module 115 can receive one or more images. According to one embodiment, the short-range communication module 115 can acquire images from other electronic devices connected to the electronic device through a network (e.g., short-range communication). The short-range communication module 115 can transmit or receive data (e.g., images and image processing information) according to a user's selection to/from the other electronic devices when short-range communication is established with the other electronic devices. The short-range communication module 115 can always be maintained in a turned-on status or turned on according to a user's settings or input.

The position calculating module 117 is used to obtain a position of the electronic device and can include a Global Position System (GPS) module as a representative example thereof. The position calculating module 115 can calculate three-dimensional information on a current position according to a latitude, a longitude, and an altitude, by calculating information on a distance away from three or more base stations and accurate time information, followed by applying trigonometry to the calculated information. Alternatively, the position calculating module 117 can calculate position information by continuously receiving position information of the electronic device in real time from three or more satellites. The position information of the electronic device can be acquired by a variety of methods.

The broadcast receiving module 119 can receive a broadcast signal (e.g., a TV broadcast signal, a radio broadcast signal, and a data broadcast signal) and/or broadcast related information (e.g., information associated with a broadcast channel, a broadcast program, or a broadcast service provider) from an external broadcast management server through a broadcast channel (e.g., a satellite broadcast channel or a terrestrial broadcast channel).

The user input unit 120 can generate input data for controlling an operation of the electronic device, in response to a user's input. The user input unit 120 can include a keypad, a dome switch, a touch pad (constant pressure type/capacitive type), a jog & shuttle, and a sensor which detect various user inputs. In the embodiment of the present disclosure, the sensor can include a voice recognition sensor, an infrared sensor, an acceleration sensor, a gyro sensor, a terrestrial magnetism sensor, an illumination sensor, a color sensor, an image sensor, a temperature sensor, a proximity sensor, a motion recognition sensor, and a pressure sensor.

In addition, some parts of the user input unit 120 can be implemented in a button form at an outer region of the electronic device, or some or entire parts of the user input unit 120 can also be implemented with a touch panel. The user input unit 120 can receive a user input for initiating image operations according to an embodiment of the present disclosure and generate an input signal according to the user input. For example, the user input unit 120 can receive a user input for inserting image processing information (EXIF data or metadata) into an image and generate an input signal according to the user input. In addition, the user input unit 120 can receive a user input for outputting feedback corresponding to the image processing information inserted into the image and generate an input signal according to the user input.

The touch screen 130 is an input/output unit simultaneously performing an input function and a display function and can include a display unit 131 and a touch detecting unit 133. In the embodiment of the present disclosure, the touch screen 130 can display various screens according to operation of the electronic device through the display unit 131. For example, the various screens can include a messenger screen, a phone-call screen, a game screen, a video reproduction screen, a gallery screen, a web page screen, and a home screen. When receiving an input of a touch- or hovering-based event (e.g., a touch event or a hovering event) through the touch detecting unit 133 from a user while displaying a particular screen through the display unit 131, the touch screen 130 can transfer an input signal according to the event to the controller 180. The controller 180 can distinguish the transferred event and control an operation according to the distinguished event. According to one embodiment, while displaying an image, the touch screen 130 can receive a user input (touch or hovering event input) for inserting image processing information into the image or a user input (touch or hovering event input) for outputting feedback corresponding to the image processing information inserted into the image.

The display unit 131 can display (output) various pieces of information processed in the electronic device. For example, when the electronic device is in a phone-call mode, the display unit 131 can display a phone-call related User Interface (UI) or Graphical User Interface (GUI). When the electronic device is in a video call mode or photography mode, the display unit 131 can display a captured and/or received image and a UI and GUI related to operating the corresponding mode. The display unit 131 can display images stored in the storage unit 150 of the electronic device, images captured through the camera module 170, and images received from the outside. The display unit 131 can support an output of a visual feedback responding to a user input under control of the controller 180. In addition, the display unit 131 can display a screen according to execution of an application by the electronic device. An example of a screen of the display unit 131 operated in the present disclosure will be described below.

The display unit 131 can support a display in a landscape or portrait mode depending on an orientation of the electronic device (or a direction in which the electronic device is placed) and a display conversion depending on an orientation change between the landscape and portrait modes. The display unit 131 can include at least one of a Liquid Crystal Display (LCD), a Thin Film Transistor-LCD (TFT-LCD), a Light Emitting Diode (LED), an Organic LED (OLED), an Active Matrix OLED (AMOLED), a flexible display, a bended display, and a 3D display. Some of the displays can be implemented as a transparent display of a transparent or photo-transparent type.

The touch detecting unit 133 can be positioned on the display unit 131 and detect a user's touch event (e.g., a tap, a drag, a sweep, a flick, a drag and drop, drawing, a single-touch, a multi-touch, a gesture (e.g., writing), or hovering) on a surface of the touch screen 130. When detecting the user's touch event on the surface of the touch screen 130, the touch detecting unit 133 can detect a coordinate where the touch event occurs and transfer the detected coordinate to the controller 170. That is, the touch detecting unit 133 can detect the touch event generated by the user and generate a signal according to the detected touch event to transfer the generated signal to the controller 170. The controller 170 can control execution of a function corresponding to a region where the touch event occurs, using the signal transferred from the touch detecting unit 133.

The touch detecting unit 133 can receive a user input for initiating image operations according to an embodiment of the present disclosure and generate an input signal according to the user input. For example, the touch detecting unit 133 can receive a user input for inserting image processing information (EXIF data or metadata) into an image and generate an input signal according to the user input. The touch detecting unit 133 can receive a user input for outputting feedback corresponding to the image processing information inserted into the image and generate an input signal according to the user input.

The touch detecting unit 133 can be configured to convert a change in pressure applied to a particular portion of the display unit 131 or electrostatic capacity generated at a particular portion of the display unit 131 into an electric input signal. The touch detecting unit 133 can also be configured to detect a touch pressure depending upon an applied touch method as well as a position and an area where an input unit (e.g., a user's finger or an electronic pen) touches on or hovers over the surface of the display unit 131. When there is a touch or hovering input for the touch detecting unit 133, a signal (signals) corresponding to the input can be transferred to a touch controller (not illustrated). The touch controller (not illustrated) can process the signal (signals) and then transfer corresponding data to the controller 180. Therefore, the controller 180 can identify a region of the touch screen 130 where the touch or hovering input is generated.

The audio processing unit 140 can transmit, to a speaker (SPK) 141, an audio signal input from the controller 180 and transfer, to the controller 180, an audio signal, such as a voice, input from a microphone (MIC) 143. The audio processing unit 140 can convert voice/sound data into an audible sound to output the audible sound through the speaker 141 under the control of the controller 180 and convert an audio signal, such as a voice, received from the microphone 143 into a digital signal to transfer the digital signal to the controller 180. The audio processing unit 140 can output an audio signal responding to a user input, depending upon image processing information (e.g., a sound effect and a music file) inserted into an image.

The speaker 141 can output audio data received from the wireless communication unit 110 or stored in the storage unit 150. The speaker 141 can also output sound signals related to functions (e.g., a messenger function, an image display function, an image conversion function, a phone-call function, a capture function, and a media content file reproduction function) performed in the electronic device. The speaker 141 can support an output of auditory feedback responding to a user input under the control of the controller 180.

The microphone 143 can receive an external sound signal and process the sound signal into electric voice data. In the case of a phone-call mode, the voice data processed through the microphone 143 can be converted into a format that can be transmitted to the outside and then output through the mobile communication module 111. Various noise reduction algorithms can be implemented in the microphone 143 to remove noise generated in the process of receiving an external sound signal.

The storage unit 150 can store one or more programs executed by the controller 180 and also perform a function of temporarily storing input/output data. The input/output data can include, for example, messenger data (e.g., chat data), contact information (e.g., wired or wireless phone numbers), messages, and content (e.g., audio, videos, and images).

The one or more programs can include a program for executing an operation of displaying an image, an operation of identifying image processing information of the image in response to a user input for the image, and an operation of outputting feedback through image processing responding to the user input, based on the image processing information.

In addition, the one or more programs can include a program for executing an operation of recording user-based image processing information responding to a user input in an image, an operation of detecting a user input while the image is being displayed, an operation of identifying the image processing information in response to the user input, an operation of determining whether the user input is an effective input, with reference to the image processing information, and an operation of outputting feedback through image processing responding to the user input, based on the image processing information when it is determined that the user input is the effective input.

The storage unit 150 can store one or more images. Each of the images stored in the storage unit 150 can include first image processing information (basic EXIF data) automatically added to a header of an image file when the image is created and second image processing information (interactive information) added to the header of the image file by a user. The storage unit 150 can store various pieces of template data for supporting addition of the second image processing information to the image. The template data can be basic data for providing convenience to a user when user-based image processing information (i.e., interactive information) is inserted into the image and implemented in various ways to support visual, auditory, and tactile feedback. The image processing information (basic EXIF data and interactive information) can be defined in a predefined particular format, such as Hypertext Mark-up Language (HTML) or eXtensible Mark-up Language (XML), and added to the image file header of the image. The image processing information can be divided into the first image processing information (basic EXIF data) automatically recorded when the image is created or changed and the second image processing information (interactive information) additionally recorded by a user to provide feedback responding to a user input.

The first image processing information (basic EXIF data) can include additional information, such as copyright information, a camera maker, a camera model, an image editor, an EXIF version, date and time the image (photograph) is corrected, date and time the image is captured, an actual size of the image (photograph) uploaded to the web, exposure time (shutter speed), a capture program, a focal length of a lens, an open-aperture F number, and use or nonuse of a flash. The first image processing information can include at least one piece of additional infoHnation suitable for an environment in which the image is created or an objective of the image.

The second image processing information (interactive information) can include various pieces of information that can be executed (used) while being functionally connected to the electronic device, such as information associated with executing a function of an application (e.g., a phone-call application, a message application, a mail application, a messenger application, a memo application, a short-range communication application, or a player), information associated with an application (e.g., a phone number, a business card, a memo, mail, and a message), information on an effect (e.g., flip, sketch, shaking, mosaic, sliding, fade-in, fade-out, caricature, magnification, or reduction), information on content (e.g., a music file or a video) reproduced according to execution of a player, information on a replaced image, and information on an original image.

In addition, the second image processing information (interactive information) can include information defining a user input method for outputting feedback. The user input method can include a variety of methods such as a touch based input (a touch, a tap, a double tap, a flick, a long press, and a gesture), a hovering based input (a proximity touch (stop), a vertical movement, a horizontal movement, and a gesture), an electronic device based input (shaking, tilting, and rotating an electronic device), and a voice based input. Moreover, the second image processing information (interactive information) can include information defining a region (or a range thereof) responding to a user input for outputting feedback (e.g., a region designated by a user or automatically to detect a user input for outputting feedback as an effective input).

The second image processing information (interactive information) can be implemented with one or more of the aforementioned various pieces of information according to a user's settings.

The storage unit 150 can also store usage frequencies (e.g., usage frequencies of applications, content, template data, and images), importance, and priorities according to operating functions of the electronic device. The storage unit 150 can also store various patterns of vibration and sound data output in response to a touch input on the touch screen 130 or a hovering input thereover. The storage unit 150 can consistently or temporarily store an Operating System (OS) of the electronic device, programs related to input and display control operations using the touch screen 130, programs related to controlling various feedback outputs (display (visual output), sound (auditory output), and vibration (tactile output)) by operating a image according to image processing information, and data generated by operations of the programs.

The storage unit 150 can include at least one type of storage medium of a flash memory type memory, a hard disk type memory, a micro type memory, a card type memory (e.g., a Secure Digital (SD) card or an eXtream Digital (XD) card), a Dynamic Random Access Memory (DRAM), a Static RAM (SRAM), a Read-Only Memory (ROM), a Programmable ROM (PROM), an Electrically Erasable PROM (EEPROM), a Magnetic RAM (MRAM), a magnetic disk, and an optical disk. The electronic device can also operate in relation to a web storage performing a storage function of the storage unit 150 on the Internet.

The interface unit 160 can serve as an interface between the electronic device and all external devices connected thereto. The interface unit 160 can receive data from the external devices, receive power supply to transfer it to elements within the electronic device, or allow data within the electronic device to be transmitted to the external devices. For example, the interface unit 160 can include a wired/wireless headset port, an external charger port, a wired/wireless data port, a memory card port, a port for connecting a device provided with an identification module, an audio input/output port, a video input/output port, and an earphone port.

The camera module 170 supports a photography function of the electronic device. The camera module 170 can support capturing an image (a still image or a moving image) of a subject. The camera module 170 can photograph an arbitrary subject and transfer the captured data to the display unit 131 and the controller 180 under the control of the controller 180. The camera module 170 can include an image sensor (or a camera sensor) (not illustrated) converting an input photo signal into an electric signal and an image signal processing unit (not illustrated) converting the electric signal input from the image sensor into a digital image data. The image sensor can include a sensor using a Charge-Coupled Device (CCD) or a Complementary Metal-Oxide-Semiconductor (CMOS). The camera module 170 can support an image processing function for support of photographing according to various photographing options (e.g., zooming, a screen ratio, an effect (e.g., sketch, mono, sepia, vintage, mosaic, and a picture frame)) in accordance with a user's settings.

An image of a subject photographed through the camera module 170 can be stored in the storage unit 150 of the electronic device. In this case, the image stored in the storage unit 150 can include various pieces of image processing information (EXIF data and metadata). The image processing information can include detailed additional information, such as copyright information, a camera maker, a camera model, an image editor, an EXIF version, date and time an image (photograph) is corrected, date and time the image is captured, an actual size of the image (photograph) uploaded to the web, exposure time (shutter speed), a exposure program, a focal length of a lens, an open-aperture F number, and use or nonuse of a flash, and various pieces of additional inform can be automatically recorded when an image is created (captured).

The controller 180 can control an overall operation of the electronic device. For example, the controller 180 can perform a control related to voice communication, data communication, and video communication. The controller 180 can perform an operation related to inserting user-based image processing information into an image and an operation related to outputting feedback based on the image processing information. The controller 180 can be implemented with one or more processors controlling image processing according to image processing information by executing one or more programs stored in the storage unit 150.

In the embodiment of the present disclosure, in response to a user input, the controller 180 can acquire a display target image from the inside or outside of the electronic device and display the acquired image on the display unit 131. For example, according to a user's request, the controller 180 can acquire an image stored in the storage unit 150, an image captured through the camera module 170, or an image received from an external device (for example, a server or another electronic device) through the wireless communication unit 110, and display the image through the display unit 131.

The controller 180 can additionally insert image processing information (interactive information) corresponding to a user's settings into the displayed image and store the resulting image in the storage unit 150.

The controller 180 can acquire at least one piece of image processing information of the corresponding image and control various outputs depending upon the acquired image processing information in response to a user input for the displayed image. Particularly, the controller 180 can control image processing responding to the user input, based on the image processing information (particularly, interactive information) recorded in the displayed image. For example, based on the interactive information of the image, the controller 180 can provide various feedback outputs which can be supported through the electronic device, such as calling a linked phone-number, outputting business card information, outputting memo information, outputting an image having a particular scene effect (e.g., flip, sketch, shaking, mosaic, caricature, sliding, fade-in, fade-out, magnification, reduction, or image replacement) applied thereto, reproducing a music or video file linked to an image, and outputting vibration. An example of a specific operation of the controller 180 operated in the present disclosure will be described below.

The controller 180 according to the embodiment of the present disclosure can control various operations related to typical functions of the electronic device in addition to the aforementioned functions. For example, when a particular application is executed, the controller 180 can control an operation and displaying of a screen for the particular application. In addition, the controller 180 can receive an input signal corresponding to various touch event inputs supported by a touch-based input interface (e.g., the touch screen 130) and control an operation of functions according to the received input signal. Furthermore, the controller 180 can also control transmission and reception of various pieces of data, based on wired or wireless communication.

The power supply unit 190 can receive external power and internal power and supply power required for operating the elements under the control of the controller 180. In the embodiment of the present disclosure, the power supply unit 190 can supply power to the display unit 131 in units of pixels or block the power under the control of the controller 180.

As described above, the electronic device according to the various embodiments of the present disclosure can include all devices using an Application Processor (AP), a Graphic Processing Unit (GPU), and a Central Processing Unit (CPU), such as all information and communication devices, multimedia devices, and all application devices thereof which support the functions of the present disclosure.

The various embodiments of the present disclosure described herein can be implemented in a recording medium which can be read through a computer or a similar device thereto using software, hardware, or a combination thereof. According to the hardware implementation, the embodiments of the present disclosure described herein can be implemented using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro-processors, and electrical units for performing other functions.

The recording medium can include a computer readable recording medium with programs recorded therein for executing an operation of acquiring an image, an operation of recording image processing information in the image, an operation of acquiring the image processing information for processing the image, and an operation of processing the image based on the image processing information and outputting related feedback.

In some cases, the embodiments described in this specification can be implemented by the controller 180 in itself. In addition, according to the software implementation, the embodiments, such as procedures and functions, described in this specification can also be implemented with separate software modules. The software modules can perform one or more functions and operations described in this specification.

Figure 2:
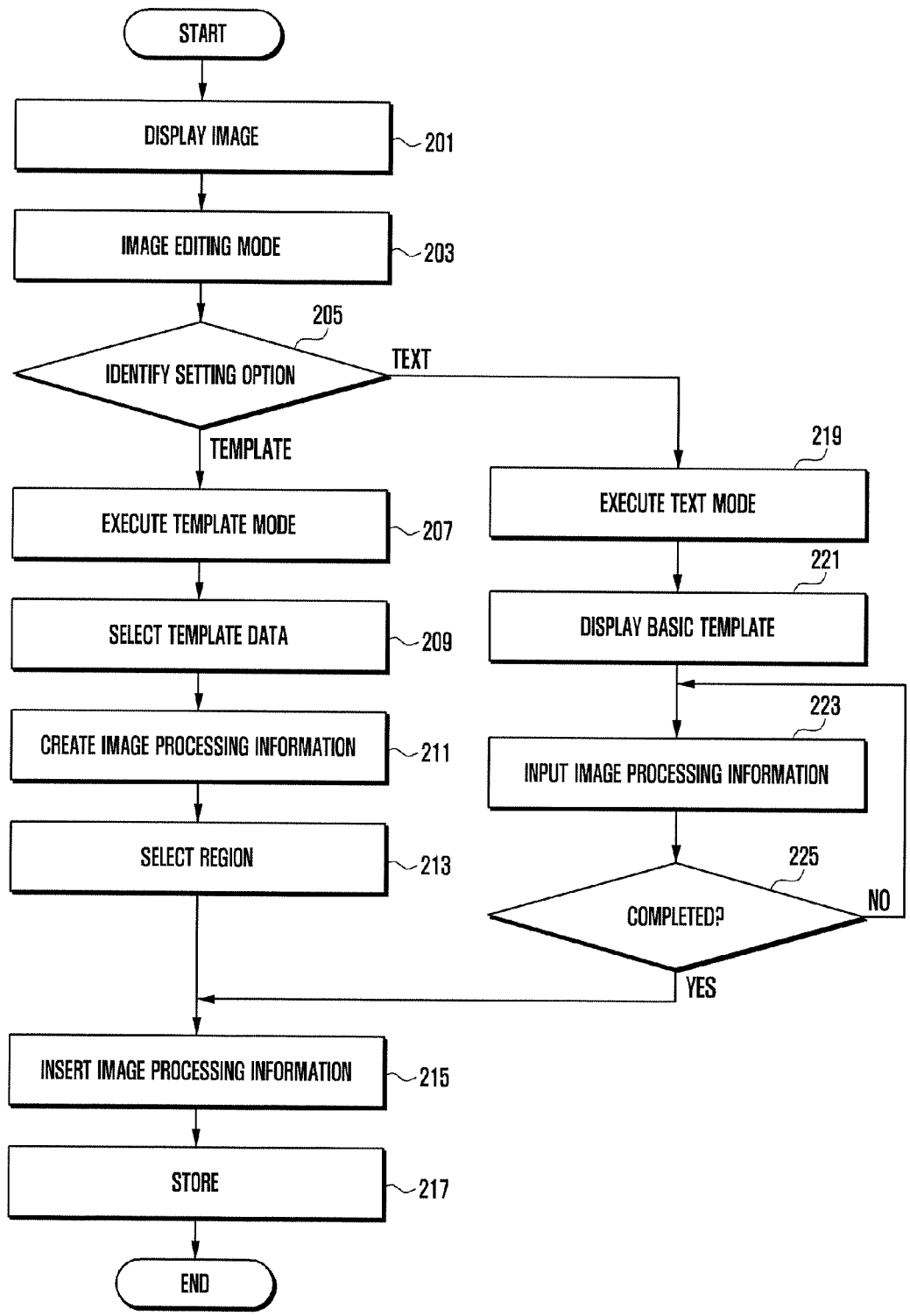
FIG. 2 is a flowchart illustrating a method of inserting user-based image processing information into an image in an electronic device according to an embodiment of the present disclosure.

FIG. 2 is a flowchart illustrating a method of inserting user-based image processing information into an image in an electronic device according to an embodiment of the present disclosure.

Referring to FIG. 2, a controller 180 can display an image corresponding to a user's request through a display unit 131 (Step 201). For example, the user can select an image from an image list screen including one or more images to insert user-based image processing information (interactive information) thereinto, and the controller 180 can control such that the selected image is displayed in response to the user's input for selecting the image. Here, the image can be one original image or a combined image obtained by editing (combining) a plurality of images. In addition, the image can include an image stored in a storage unit 150, an image captured in a photography mode, or an image received from the outside. Furthermore, the image can include typical image processing information (basic EXIF data) and can also include additional image processing information (interactive information) previously added by the user.

The controller 180 can control execution of an image editing mode (Step 203). For example, the user can enter a user input for executing the image editing mode to additionally record user-based image processing information in the displayed image. The controller 180 can execute the image editing mode in response to the user input for executing the image editing mode. In the embodiment of the present disclosure, the image editing mode can be an editing mode in which user-based image processing information (e.g., interactive information) can be inserted into an image.

When executing the image editing mode, the controller 180 can identify a setting option representing a method of inserting image processing information (Step 205). The process of identifying the setting option can include an operation of identifying a setting option (e.g., a template mode or a text mode) configured in advance by the user or an operation of requesting the user to select a setting option when entering the image editing mode and identifying the selection of the setting option.

When the setting option is identified to be a template mode, the controller 180 can control execution of the template mode (Step 207). The controller 180 can display a screen interface to select template data when executing the template mode. For example, the controller 180 can display a popup window including a list of template data. In the embodiment of the present disclosure, the template mode can be a mode in which user-based image processing information (i.e., interactive information) can be more conveniently added using template data previously stored in the electronic device or template data acquired from the outside.

When the user selects particular template data in the template mode (Step 209), the controller 180 can create image processing information corresponding to the selected template data (Step 211).

The controller 180 can receive a selection of an insertion region where the image processing information is to be inserted into the image (Step 213). In the embodiment of the present disclosure, the selection of the insertion region can be selectively performed by the user. When the insertion region is selected, the controller 180 can operate to respond to a user input through the selected insertion region. In contrast, when the insertion region is not selected, the controller 180 can operate to respond to a user input through the image itself (i.e., all regions of the image). Step 213 can be omitted in the embodiment of the present disclosure.

The controller 180 can insert the image processing information into the image (Step 215). For example, the controller 180 can insert the image processing information into an image file header of the image. The image processing information added to the image file header will be described below.

The controller 180 can store the image with the image processing information inserted thereinto (Step 217). The controller 180 can store the image according to "Change basic file" to delete an existing image file corresponding to the image or "Save as a different name" to maintain the existing image file. Such a storing method can be performed automatically according to the user's settings or manually by the user's selection every time an image is stored.

When the setting option is identified to be a text mode, the controller 180 can control execution of the template mode (Step 219). When executing the text mode, the controller 180 can display a screen interface such that the user can insert image processing information. For example, the controller 180 can display a text window such that the user can directly input the image processing information. In the embodiment of the present disclosure, the text mode can be a mode in which the user can directly input various pieces of information (a region (coordinate), a feedback operation, and an operating range) corresponding to the image processing information as text in the text window or can input the various pieces of information using a template according to a basic guide.

The controller 180 can display a basic template through the text window (Step 221). The basic template can represent a basic frame according to a text type (e.g., html and xml) for defining image processing information in an image file header. The basic template will be described below.

The controller 180 can input and display image processing information in the text window in response to a user input through the text window (Step 223) and check whether the user input is completed for the image processing information (Step 225). The controller 180 can control the operation of inputting the image processing information until the user input is completed.

When the user input is identified to be completed, the controller can insert the image processing information into the image as described above (Step 215) and store the image with the image processing information inserted thereinto (Step 217).

In the embodiment of the present disclosure, the image processing information (interactive information) can be recorded in an image captured through a camera module 170 and stored in the image storage unit 150 or an image acquired from the outside (e.g., servers or other electronic devices).

Figure 3:
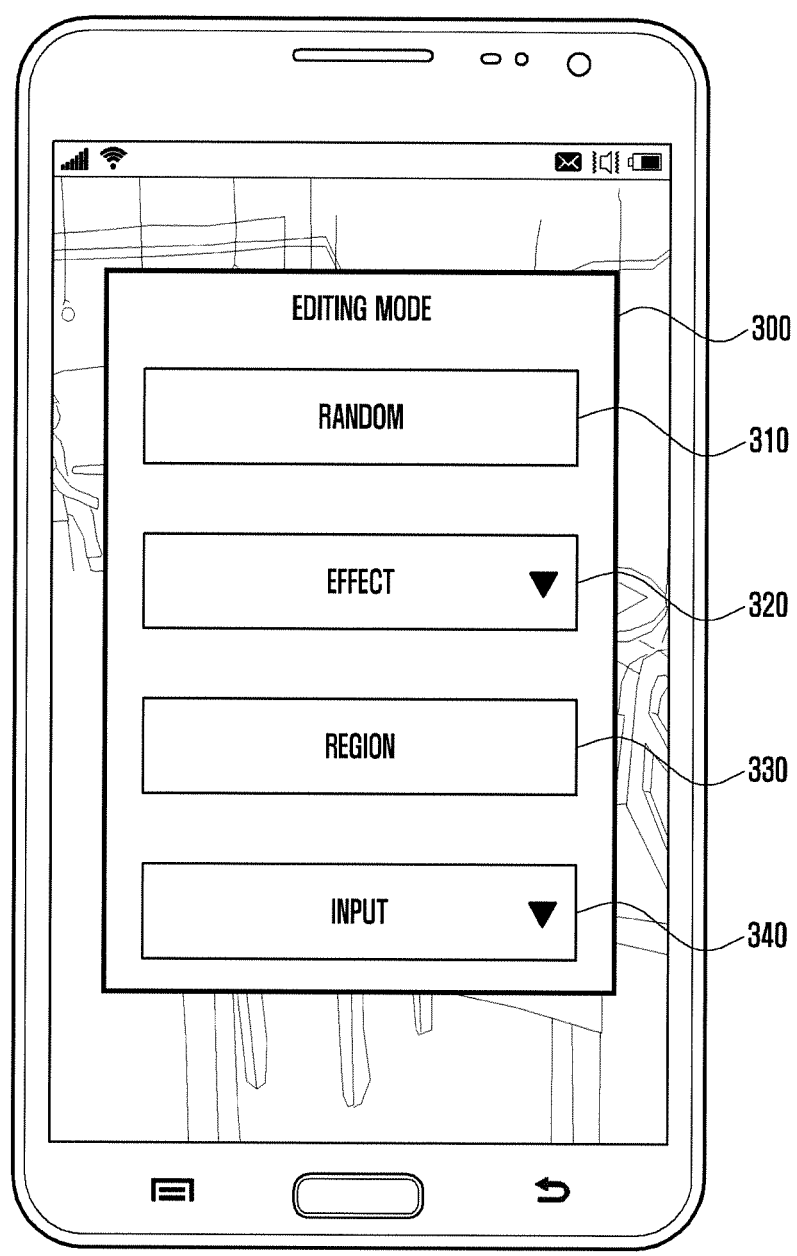
FIGS. 3 and 4 illustrate examples of a screen interface supported by an electronic device according to an embodiment of the present disclosure.

FIG. 3 illustrates an example of a screen interface supported by an electronic device according to an embodiment of the present disclosure. Particularly, in relation to setting options, an example of a screen in a template mode is illustrated in FIG. 3.

Referring to FIG. 3, when a user selects an image to record user-based image processing information (interactive information) and a template mode corresponds to a predefined setting option or is selected by the user, a menu window 300 can be displayed through one portion of a screen or the entire portion of the screen with the image displayed thereon to select various pieces of template data. The template data can be basic data for providing convenience to the user when the user-based image processing information (i.e., interactive information) is inserted into the image and include data for supporting at least one of visual, auditory, and tactile feedback outputs.

As illustrated in FIG. 3, the menu window 300 can provide a random option 310 for randomly selecting particular template data supported by the electronic device and automatically inserting the corresponding image processing information into the image, an effect option 320 for selecting at least one of various effects (e.g., flip, sketch, shaking, mosaic, caricature, sliding, fade-in, fade-out, magnification, reduction, and image replacement) and automatically inserting the selected effect into the image, a region option 330 for designating a particular or entire region of the image to output feedback, and input option 340 for defining a user input method to output feedback.

For example, it is assumed that the user selects a shaking effect through the effect option 320 and a particular region of the image through the region option 330 in the menu window 300. The controller 180 can record additional image processing information (i.e., interactive information) corresponding to the user's selection in the existing image processing information of the image file header of the displayed image. Such an example is illustrated in TABLE 1 below.

TABLE 1

<interactivemap>
<areashape="rect" coords="40,113,150,138" onTouch="Shaking">
</interactivemap>

As illustrated in TABLE 1 above, interactive information making an image shaken in response to a user's input for the designated region (e.g., coordinates "40, 113, 150, 138") in the corresponding image can be recorded in the image file header.

Figure 4:
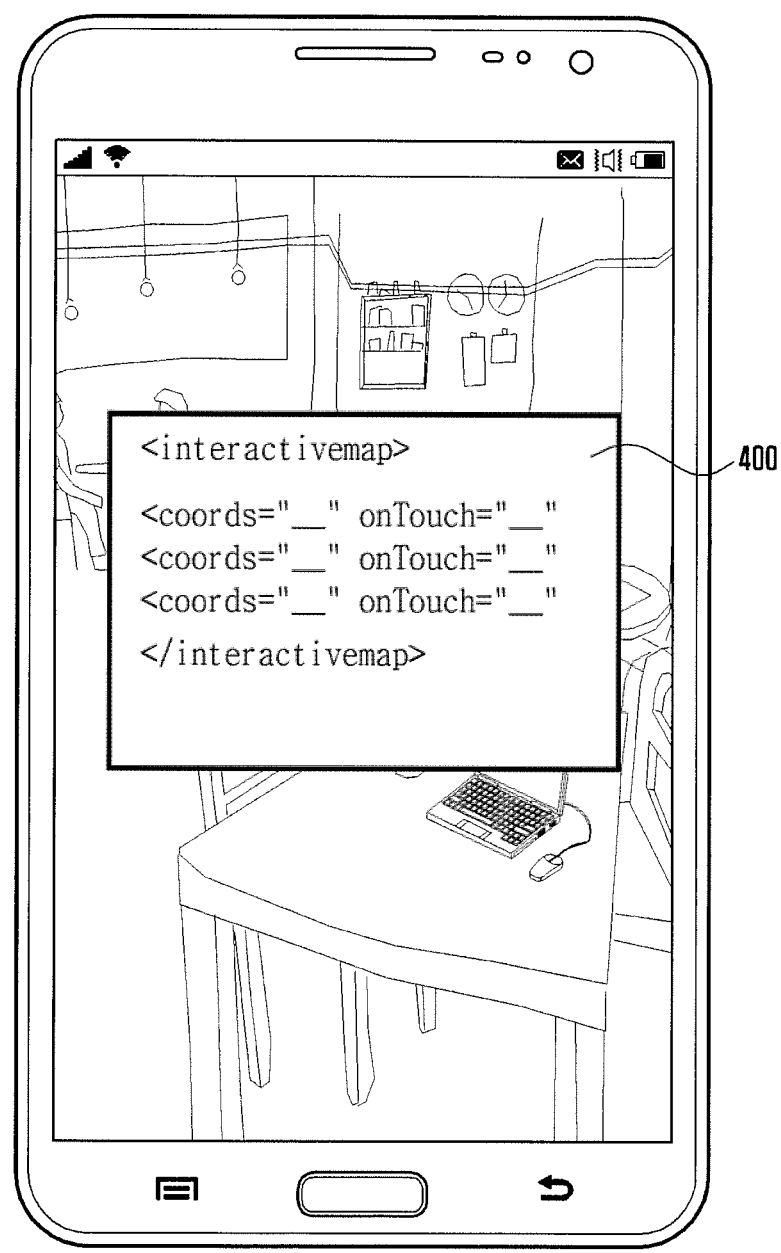

FIG. 4 illustrates an example of a screen interface supported by an electronic device according to an embodiment of the present disclosure. Particularly, in relation to setting options, an example of a screen in a text mode is illustrated in FIG. 4.

Referring to FIG. 4, when a user selects an image to record user-based image processing information (interactive information) and a text mode corresponds to a predefined setting option or is selected by the user, a text window 400 can be displayed through one or entire portion of a screen with the image displayed thereon to input the image processing information. The text mode can be a mode in which the user can directly input various pieces of information (a region (coordinate), a feedback operation, and an operating range) corresponding to the image processing information as text in the text window 400 or can input the various pieces of information using a basic template.

As illustrated in FIG. 4, the text window 400 can include a basic template such as <interactivemap>, </interactivemap>, and <cords="Input coordinates or select a region in the image", ontouch="Input/select an effect">. The basic template can represent a basic frame according to a text type (e.g., html and xml) for defining image processing information in an image file header. Therefore, the user can input or select information according to the guide (e.g., "Input coordinates or select a region in the image" and "Input/select an effect") in the text window 400 to insert the image processing information into the image. When the image processing information is completed according to the user input, the image file header can have such a form as illustrated in Table 1 above.

Although the basic template having a particular form is provided through the text window 400 in FIG. 4, the present disclosure is not limited thereto, and the basic template can be implemented in various manners according to a text type (e.g., html and xml) or omitted.

As illustrated in FIGS. 3 and 4, in the embodiments of the present disclosure, the image processing information can be automatically input in the template mode or directly input by the user in the text mode. Furthermore, in the above description, the feedback corresponding to shaking is provided in response to the user input for the configured region (coordinates) in the image. As in the operating examples, the user can set various feedback outputs such as image replacement, flip, image magnification, image fade in or out, mosaic, calling a linked phone number, an image with a particular effect applied thereto, music file reproduction, and video reproduction. In addition, the user can record one piece of image processing information in one image as described above.

Furthermore, the user can also record, in an image, a plurality of pieces of image processing information obtained by combining at least two of different effects, a user input method, and different regions. An example of this is illustrated in TABLE 2 below.

TABLE 2

<interactivemap>
<coords="X1, Y1" onTouch="Flip">
<coords="X2, Y2" onTouch="Fadeout Maximize">
<coords="X3, Y3" onTouch="Shaking">
</interactivemap>

As illustrated in TABLE 2 above, interactive information making an image maximized or shaken while being flipped and faded out according to a region (coordinates) where a user input (e.g., a touch) occurs in the corresponding image can be recorded in the image file header. In addition, according to an embodiment of the present disclosure, when the user designates a particular region (coordinates) (e.g., Xn and Ym, where n and m are natural numbers) in the image as described above, a user input within a predetermined range with the designated region (coordinates) as the center thereof can be processed into an effective input. According to one embodiment, ranges having various shapes (e.g., a rectangle and a circle) with a particular region (coordinates) designated by the user as the center thereof can also be automatically set. Therefore, the controller 180 can control image processing (feedback outputs) in response to a user input within a set range with the designated coordinates as the center thereof.

In the embodiments illustrated in FIGS. 3 and 4, interactive information is recorded for one image. Furthermore, according to an embodiment of the present disclosure, when images (e.g., four images) with user-based interactive information additionally inserted thereinto are combined and stored as one image by a user's image editing, the interactive information of each image can be automatically combined to the image file header of the corresponding combined image. A description thereof will be given with reference to FIG. 5.

Figure 5:
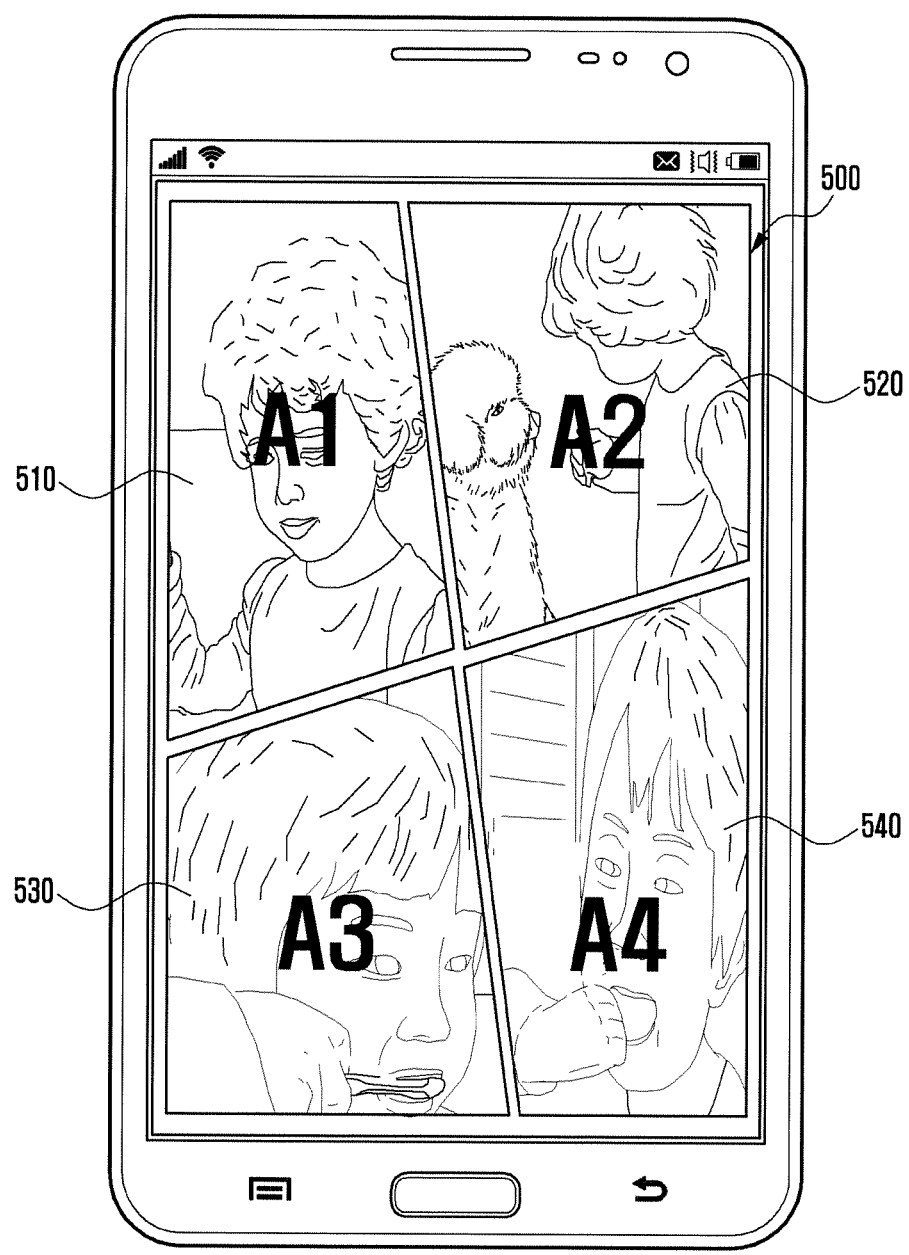
FIG. 5 illustrates an example of an operation of providing an image responding to a user input in an electronic device according to an embodiment of the present disclosure.

FIG. 5 illustrates an example of an operation of providing an image responding to a user input in an electronic device according to an embodiment of the present disclosure.

Referring to FIG. 5, four images (e.g., image A1 510, image A2 520, image A3 530, and image A4 540) can be combined (coupled) by a user's image editing and displayed as one combined image 500. For example, the four images 510, 520, 530, and 540 are combined in a grid shape as illustrated in FIG. 5. Here, as described above, image A1 510, image A2 520, image A3 530, and image A4 540 can have user-based interactive information inserted thereinto.

For example, image A1 510 can include interactive information for allowing flip feedback to be output in response to a touch input for an arbitrary region, image A2 520 can include interactive information for allowing image maximizing feedback to be output in response to a touch input for an arbitrary region, image A3 530 can include interactive information for allowing shaking feedback to be output in response to a touch input for an arbitrary region, and image A4 540 can include interactive information for allowing mosaic feedback to be output in response to a touch input for an arbitrary region. When the four images 510, 520, 530, and 540 are integrated into one image 500 by the user as illustrated in FIG. 5, a controller 180 can collect the interactive information of the four images 510, 520, 530, and 540 and record the collected interactive information in the image file header of the image 500. Such an example is illustrated in Table 3 below.

TABLE 3

<interactivemap>
<areashape="rect" coords="Region of A1 Image (510)" onTouch="Flip">
<areashape="rect" coords="Region of A2 Image (520)" onTouch="Maximize">
<areashape="rect" coords="Region of A3 Image (530)" onTouch="Shaking">
<areashape="rect" coords="Region of A4 Image (540)" onTouch="Mosaic">

As illustrated in Table 3 above, interactive information for allowing flip, maximizing, shaking and mosaic feedback to be output for the respective images (image A1 510, image A2 520, image A3 530, and image A4 540) depending upon a region (coordinates) where a user input (e.g., a touch) occurs in the combined image 500 can be recorded in the image file header.

For example, as illustrated in FIG. 5, the image 500 can be obtained by combining image A1 510, image A2 520, image A3 530, and image A4 540 through four divided rectangular regions. Before integration into the image 500, the images 510, 520, 530, and 540 can have been stored with different or the same interactive information inserted into the corresponding original images thereof. In addition, as illustrated in TABLE 3 above, when the images 510, 520, 530, and 540 are combined with one another, shapes and ranges (coordinates) of the four divided regions where the images 510, 520, 530, and 540 are formed, respectively, can be automatically changed, thereby constituting the interactive information.

In FIG. 5 and Table 3, when the plurality of images 510, 520, 530, and 540 are combined with one another, at least four pieces of interactive information thereof are all collected and included in the combined image 500. In addition, the combined image 500 can include additional interactive information in addition to the collected interactive information. Alternatively, the collected interactive information can be deleted by the user, and at least one other piece of interactive information can be recorded for the combined image 500 itself or a particular region as illustrated in Table 1 or 2 above.

Figure 6:
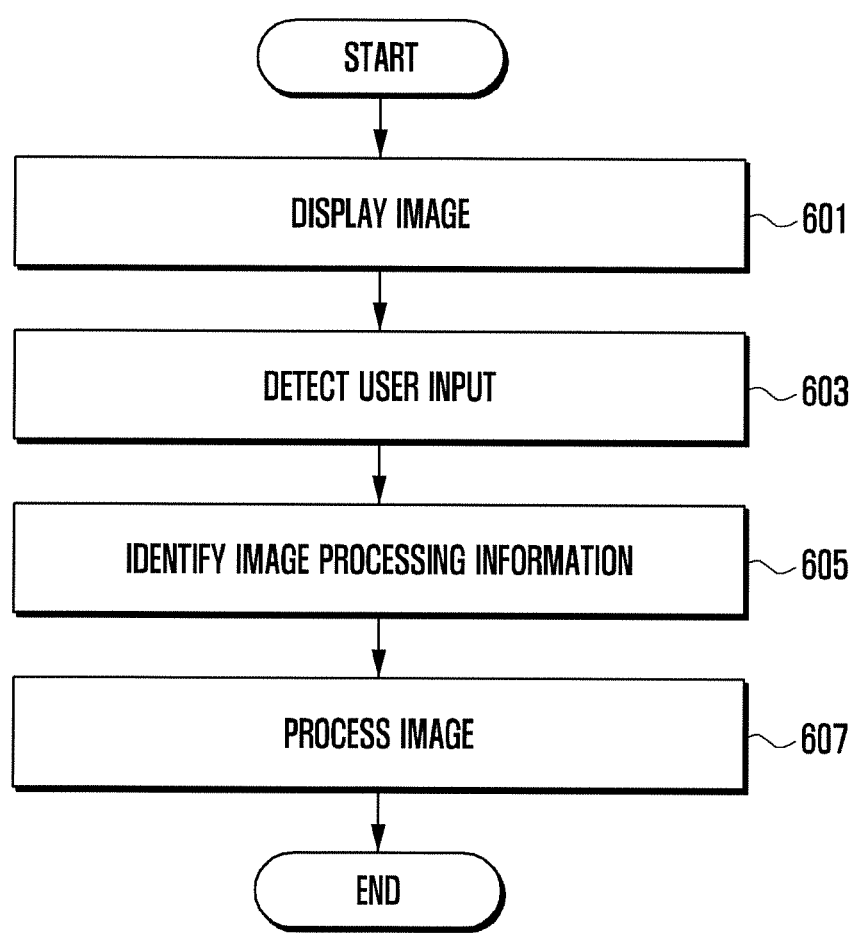
FIG. 6 is a flowchart illustrating a method of providing an image responding to a user input in an electronic device according to an embodiment of the present disclosure.

FIG. 6 is a flowchart illustrating a method of providing an image responding to a user input in an electronic device according to an embodiment of the present disclosure.

Referring to FIG. 6, a controller 180 can display an image corresponding to a user's request through a display unit 131 (Step 601). For example, the user can select an image to be displayed from an image list screen including one or more images or perform manipulation through a web function of the electronic device such that a web page including an image is displayed. The controller 180 can control such that an image is displayed in response to a user input for selecting the image or a request for displaying a web page including the image. Here, the image can be one original image or a combined image obtained by editing (combining) a plurality of images.

While the image is being displayed, the controller 180 can detect a user input for the image (Step 603). In the embodiment of the present disclosure, the user input can be made on a region of the displayed image by physical contact or proximity awareness on a touch screen 130 using an input unit (e.g., a finger or an electronic pen).

The controller 180 can identify image processing information of the image when detecting the user input thereon (Step 605). For example, the controller 180 can identify EXIF data (metadata) inserted into the image by parsing the image file header of the image. Particularly, in the embodiment of the present disclosure, the controller 180 can identify user-based interactive information of the image processing information included in the image.

The controller 180 can control image processing responding to the user input (Step 607). The controller 180 can control a feedback output corresponding to the image processing information of the image in response to the user input. Here, the controller 180 can control at least one of auditory, visual, and tactile feedback outputs, based on the image processing information.

Figure 7:
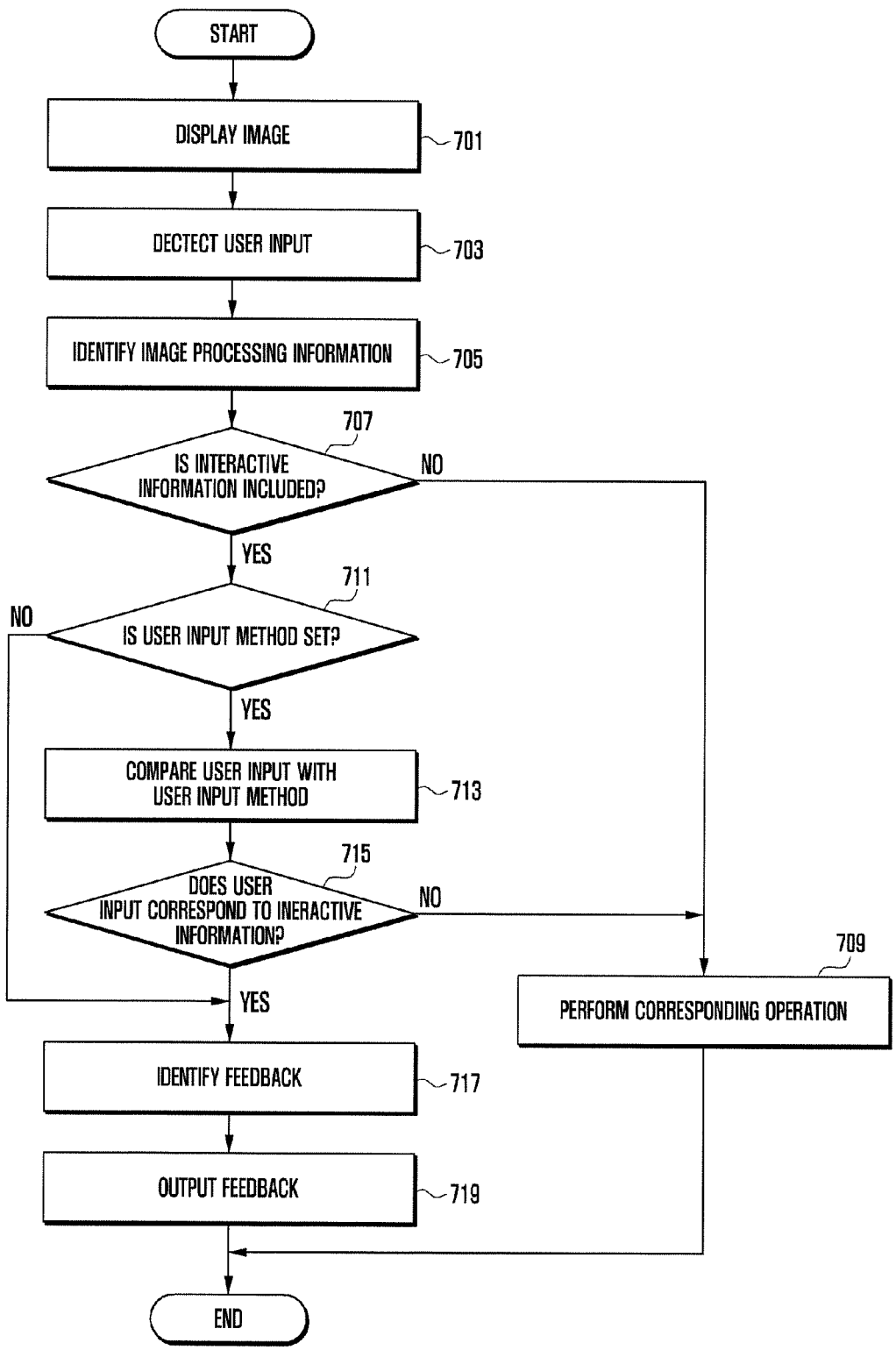
FIG. 7 is a flowchart illustrating a method of providing feedback in response to a user input for an image in an electronic device according to an embodiment of the present disclosure.

FIG. 7 is a flowchart illustrating a method of providing feedback in response to a user input for an image in an electronic device according to an embodiment of the present disclosure.

Referring to FIG. 7, a controller 180 can display an image corresponding to a user's request through a display unit 131 (Step 701).

While the image is being displayed, the controller 180 can detect a user input for the image (Step 703).

The controller 180 can identify image processing information of the image when detecting the user input thereon (Step 705). For example, the controller 180 can identify EXIF data (metadata) inserted into the image by parsing the image file header of the image.

The controller 180 can determine whether the image processing information includes interactive information (Step 707).

When it is determined that the image processing information dose not include the interactive information (Step 707—No), the controller 180 can control performance of the corresponding operation (Step 709). For example, the controller 180 can output basic EXIF data of the image, control execution of the corresponding function of the electronic device in response to the user input, or ignore the user input (for example, omit an operation for the user input).

When it is determined that the image processing information includes the interactive information (Step 707—Yes), the controller 180 can determine whether a user input method has been set in the interactive information (Step 711). For example, the interactive information can include information defining the user input method for outputting feedback. The user input method can include various methods such as a touch based input, a hovering based input, an electronic device based input, and a voice based input.

When it is determined that the user input method has not been set in the interactive information (Step 711—No), the controller 180 can directly proceed to Step 717 to perform the following operations.

When it is determined that the user input method has been set in the interactive information (Step 711—Yes), the controller 180 can compare the user input method defined in the interactive information with the user input (Step 713) and determine whether the user input corresponds to the user input method of the interactive information (Step 715). For example, when the user input method of the interactive information is a touch based input method in which a touch horizontally moves from left to right, the controller 180 can determine whether the user input corresponds to an input having moved horizontally in the same direction according to the user input method. Alternatively, when the user input method of the interactive information is an electronic device based input method for shaking an electronic device, the controller 180 can determine whether the user input corresponds to an input for shaking the electronic device according to the user input method.

When it is determined that the user input does not correspond to the user input method (Step 715—No), the controller 180 can control performance of the corresponding operation (Step 709). For example, the controller 180 can ignore the user input (for example, omit an operation for the user input), output a guide for a correct input while informing that the user input has been incorrectly entered, or control execution of a function of the electronic device corresponding to the user input.

When it is determined that the user input corresponds to the user input method (Step 715—Yes), the controller 180 can identify feedback according to the interactive information (Step 717). For example, the interactive information can include information defining various methods for outputting feedback. The feedback can include various feedback outputs that the electronic device can provide in a visual, auditory, or tactile manner, such as a particular effect for an image itself (e.g., flip, sketch, caricature, shaking, mosaic, sliding, fade-in, fade-out, magnification or reduction), image replacement, music file reproduction, video reproduction, and patterned vibration.

The controller 180 can control a feedback output corresponding to the interactive information in response to the user input (Step 719). The controller 180 can control at least one of auditory, visual, and tactile feedback outputs in response to the interactive information.

FIGS. 8 to 14 illustrate examples of an operation of providing an image responding to a user input in an electronic device according to an embodiment of the present disclosure.

Figure 8:
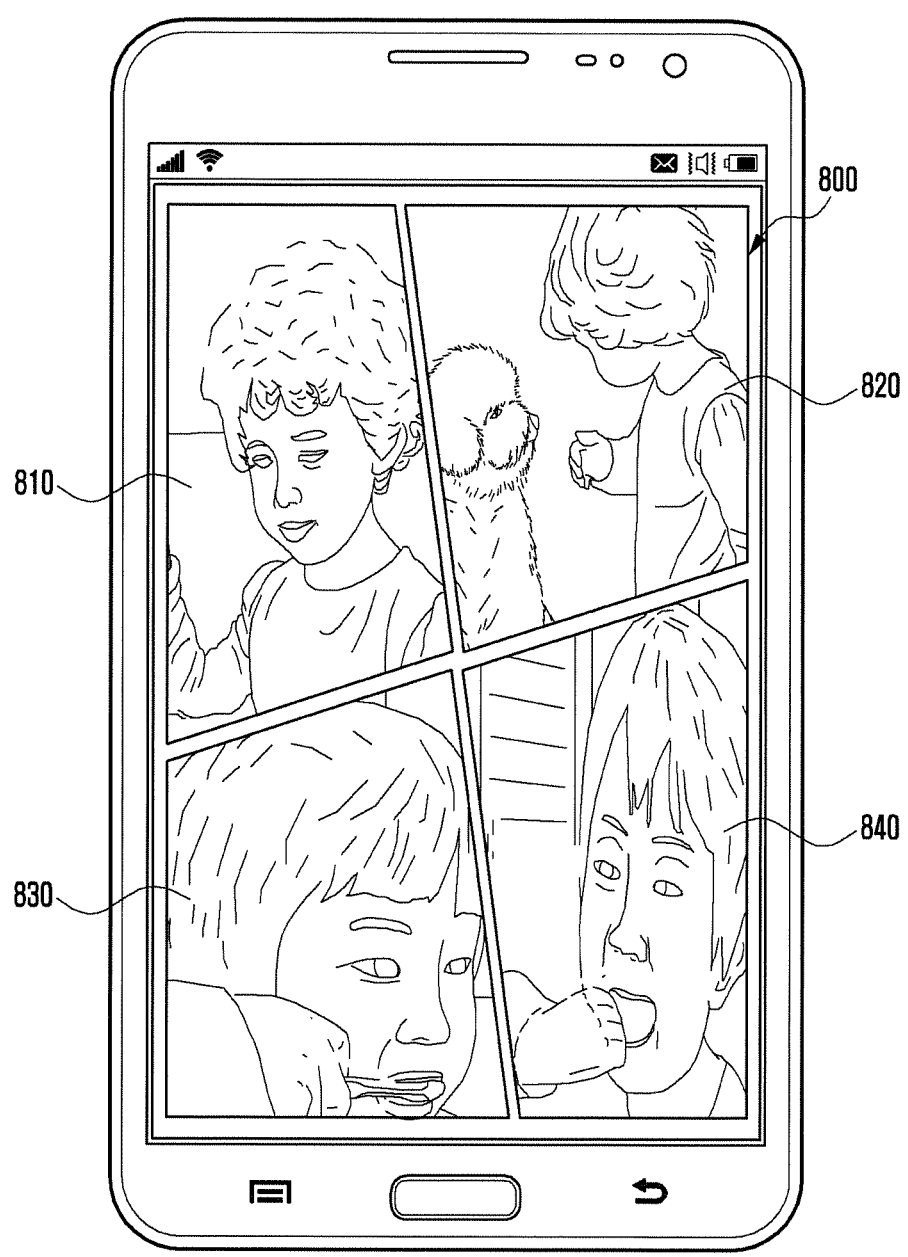
FIGS. 8 to 14 illustrate examples of an operation of providing an image responding to a user input in an electronic device according to an embodiment of the present disclosure.

Referring to FIGS. 8 to 14, FIG. 8 illustrates an example of a screen of the electronic device on which a particular image 800 is displayed depending upon a user's selection. In FIG. 8, four images 810, 820, 830, and 840 are combined with one another and displayed in a grid form through four divided regions. It is assumed that a user input for image processing (i.e., a feedback output by an image) is not particularly limited in the state illustrated in FIG. 8 and image processing can be executed by various input methods, such as touch-, hovering-, electronic device-, and voice-based inputs that a user can input to an image.

Hereinafter, with reference to FIGS. 8 to 12, examples of an operation will be described in a case where the four images (e.g., image B1 (810), image B2 (820), image B3 (830) and image B4 (840)) constituting the image 800 have different interactive information (e.g., flip, maximizing, shaking, and caricature) and feedback responding to a user input is output by the individual images 810, 820, 830, and 840.

Figure 9:
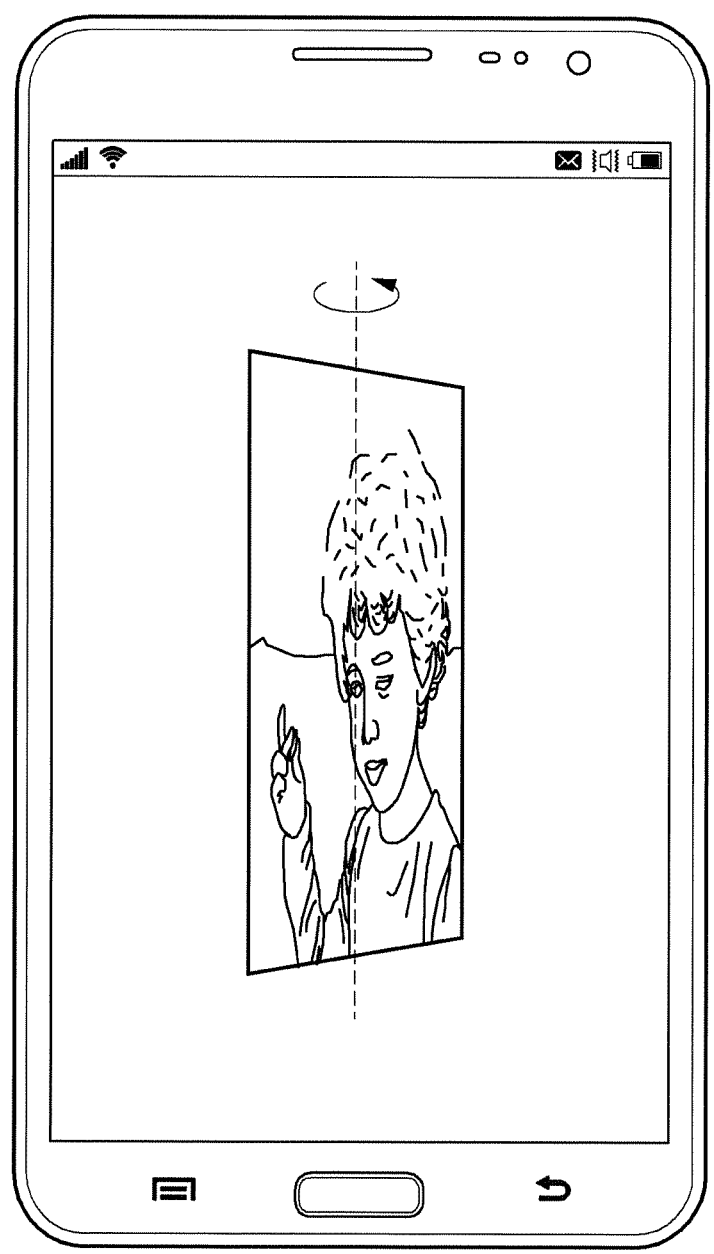

While the image 800 is being displayed as illustrated in FIG. 8, a controller 180 can identify interactive information recorded in a region of image B1 (810) with reference to the image file header of the image 810 when detecting a user input (e.g., a touch) on the region where image B1 (810) is positioned. In addition, the controller 180 can control an output of feedback (e.g., a flip effect) corresponding to the interactive information using image B1 (810) (or the original image corresponding to image B1 (810)). For example, the controller 180 can make image B1 (810) (or the original image of image B1 (810)) subject to rendering in response to the user input and display an operating state in which the rendered image is processed to correspond to the flip effect. According to one embodiment, as illustrated in FIG. 9, the controller 190 can output feedback of an optical scene effect (e.g., flip over, flop over, flip shot, flip over wipe, flip frame, or flip wipe) that image B1 (810) seems to be replaced by another image on the back thereof while rotating about a horizontal or vertical axis thereof.

Figure 10:
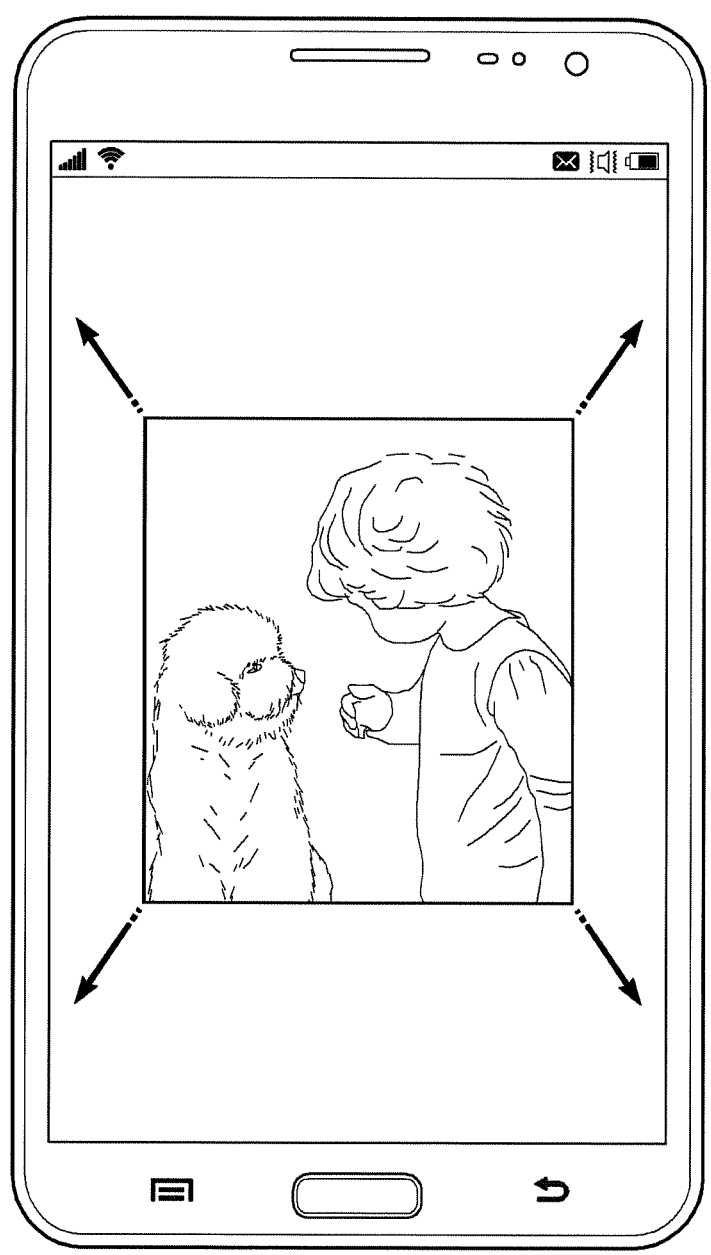

In addition, when detecting a user input (e.g., a touch) on the region where image B2 (820) is positioned, the controller 180 can control an output of feedback (e.g., a magnification effect) corresponding to the corresponding interactive information using image B2 (820) (or the original image corresponding to image B2 (820)). For example, the controller 180 can make image B2 (820) (or the original image of image B2 (820)) subjected to rendering in response to the user input and display an operating state in which the rendered image is processed to correspond to the magnification effect. According to one embodiment, as illustrated in FIG. 10, the controller 180 can output feedback of a scene effect that image B2 (820) seems to be replaced by a magnified image while being gradually enlarged.

Figure 11:
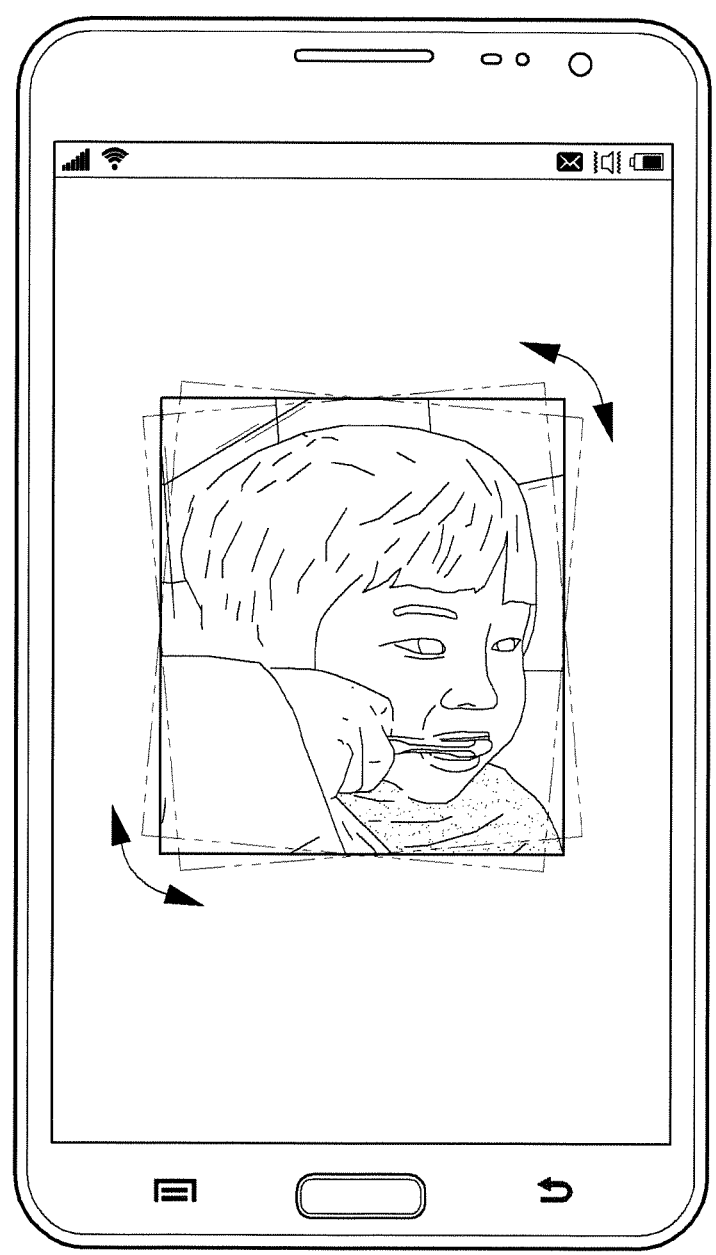

Furthermore, when detecting a user input (e.g., a touch) on the region where image B3 (830) is positioned, the controller 180 can control an output of feedback (e.g., a shaking effect) corresponding to the corresponding interactive information using image B3 (830) (or the original image corresponding to image B3 (830)). For example, the controller 180 can make image B3 (830) (or the original image of image B3 (830)) subject to rendering in response to the user input and display an operating state in which the rendered image is processed to correspond to the shaking effect. According to one embodiment, as illustrated in FIG. 11, the controller 180 can output feedback of a scene effect that image B3 (830) seems to be vibrated or shaken in a particular form. For example, the controller 180 can represent a feeling as if image B3 (830) is shaken (vibrated) in a left-right, up-down, or front-rear direction, or can represent several complex feelings such as curvilinear vibration or random zigzag movement.

Figure 12:
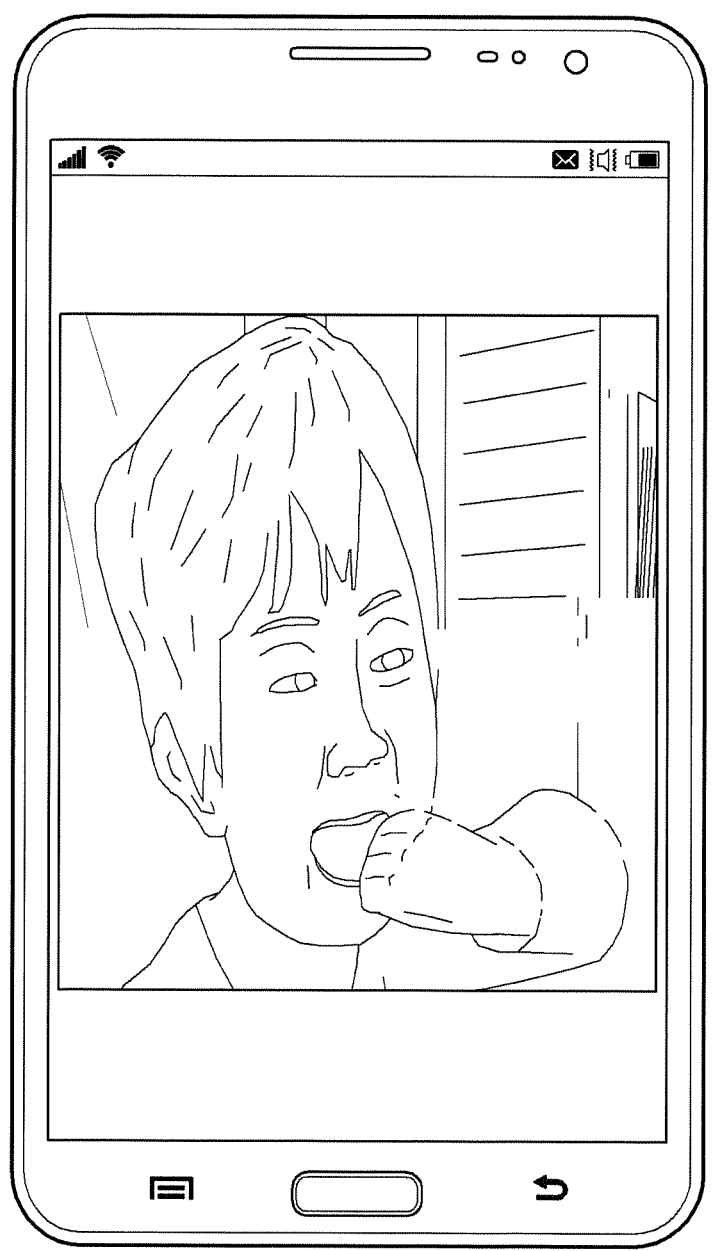

Furthermore, when detecting a user input (e.g., a touch) on the region where image B4 (840) is positioned, the controller 180 can control an output of feedback (e.g., a caricature effect) corresponding to the corresponding interactive information using image B4 (840) (or the original image corresponding to image B4 (840)). For example, the controller 180 can make image B4 (840) (or the original image of image B4 (840)) subject to rendering in response to the user input and display an operating state in which the rendered image is processed to correspond to the caricature effect. According to one embodiment, as illustrated in FIG. 12, the controller 180 can output feedback of a scene effect that image B4 (840) taking the form of an illustration seems to be exaggerated or distorted in external characteristics.

Figure 13:
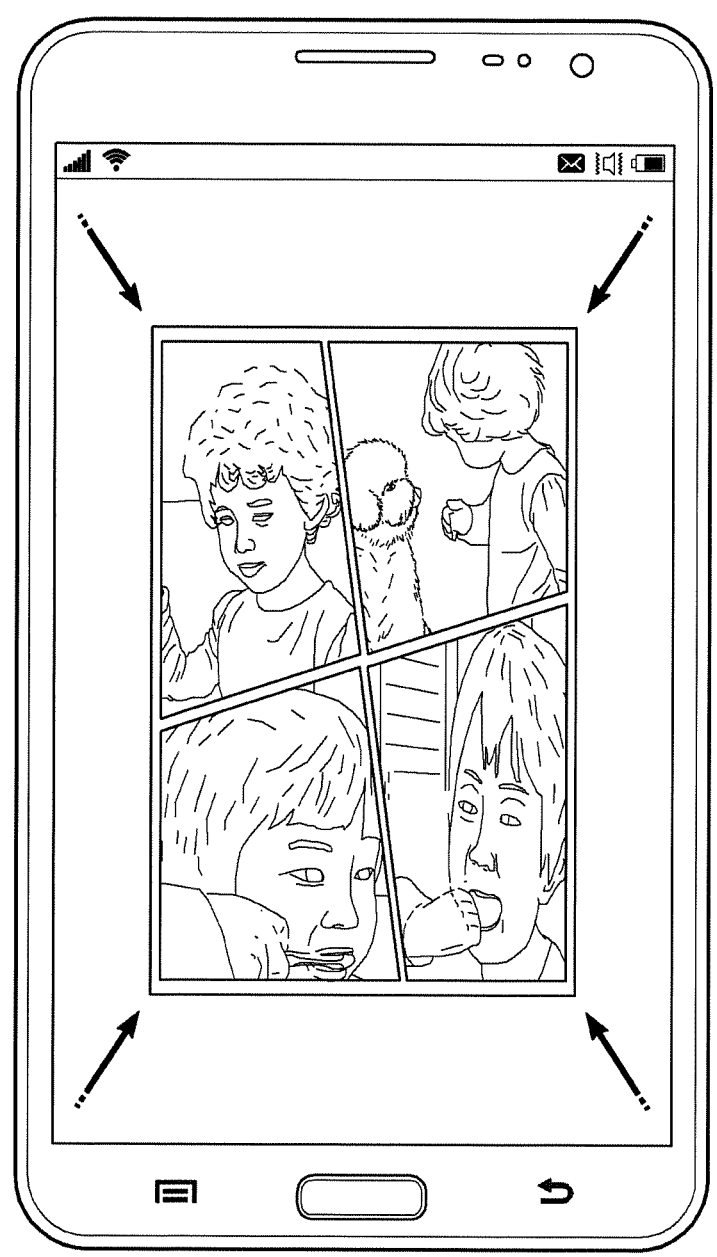
Figure 14:
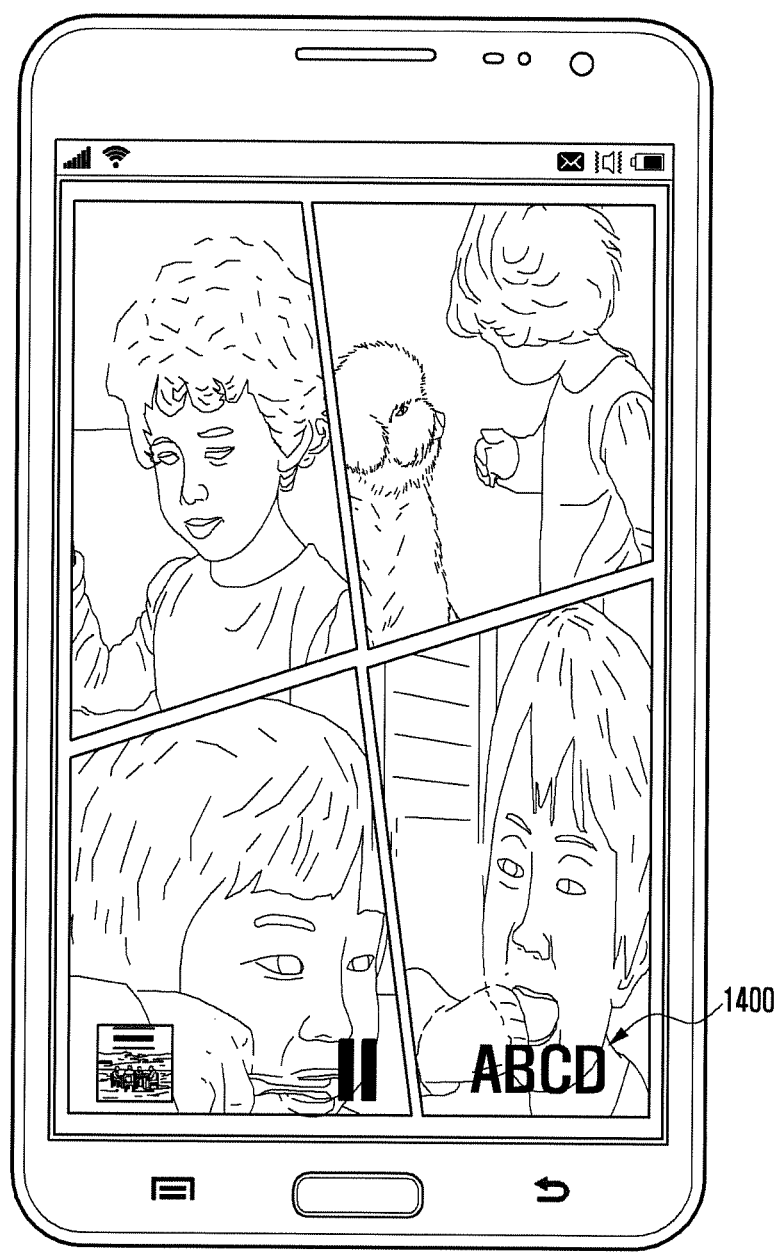

Hereinafter, with reference to FIGS. 8, 13 and 14, examples of an operation will be described in a case where the image 800 has at least one piece of interactive information (e.g., reduction or music file reproduction) through the entire or particularly designated region thereof and feedback responding to a user input is output by the image 800.

While the image 800 is being displayed as illustrated in FIG. 8, when the controller 180 detects a user input (e.g., a touch) on an arbitrary region of the image 800 or a particular region corresponding to a user's designation, the controller 180 can identify interactive information, recorded in the image 800, with reference to the image file header of the image 800. In addition, the controller 180 can control an output of feedback (e.g., a reduction effect or music file reproduction) corresponding to the interactive information using the image 800.

For example, the controller 180 can make the image 800 subjected to rendering in response to a user input and display an operating state in which the rendered image is processed to correspond to the reduction effect. According to one embodiment, as illustrated in FIG. 13, the controller 180 can output feedback of a scene effect that the image 800 seems to be replaced by a reduced image while being gradually decreased.

In another example, while the image 800 is being displayed, the controller 180 can reproduce a linked music file and display an operating state thereof according to interactive information in response to a user input. According to one embodiment, as illustrated in FIG. 14, the controller 180 can invoke and reproduce (output sound) a music file according to interactive information and output an information item 1400 related to the reproduced music file on a predetermined portion (e.g., a lower side) of the image 800. The information item 1400 can include information such as album jacket image of the music file, a control item for controlling a function related to reproduction of the music file, and the title (e.g., ABCD) of the currently reproduced music file. The information item 1400 can be provided in an overlay form in a predefined region of the upper end portion, the central portion, and the lower end portion of the displayed image 800 or can be provided at a particular position (e.g., an indicator region of the electronic device).

According to one embodiment of the present disclosure, the controller 180 can output the feedback illustrated in FIGS. 9 to 14 in response to the user input in the state illustrated in FIG. 8 and then control image processing such that the image automatically or manually returns to the original status thereof illustrated in FIG. 8. For example, when predetermined time passes after the feedback output according to the user input illustrated in FIGS. 9 to 14, the controller 180 can stop the feedback output through the image processing and automatically return to the state illustrated in FIG. 8. In addition, when the controller 180 outputs the feedback according to the user input as illustrated in FIGS. 9 to 14 and then detects an interrupt (e.g., a touch-, hovering-, electronic device-, or voice-based user input) for stopping the feedback output, the controller 180 can stop the feedback output through the image processing and return to the state illustrated in FIG. 8 in response to the interrupt.

Although various embodiments of the present disclosure have been described above using particular terms, they are used in the general sense merely for the purpose of easily explaining the technical contents of the present disclosure and helping understanding of the present disclosure, and are not intended to limit the scope of the present disclosure thereto. That is, it is obvious to those skilled in the art to which the present disclosure belongs that various embodiments can be implemented based on the technical idea of the present disclosure.

According to various embodiments of the present disclosure, the respective modules can be configured with software, firmware, hardware, or combinations thereof. Furthermore, some or all modules can be configured within one entity, in which case the function of the corresponding module can be identically performed. Moreover, according to various embodiments of the present disclosure, respective operations can be executed sequentially, repeatedly, or in parallel. In addition, some operations can be omitted or can be executed while other operations are added thereto.

The various embodiments of the present disclosure as described above can be implemented in the form of a program instruction that can be performed through various computers, and can be recorded in a computer readable recording medium. The computer readable recording medium can include a program command, a data file, and a data structure independently or in combination. The program instruction recorded in the recording medium is specially designed and constructed for the present disclosure, but can be well known to and can be used by those skilled in the art of computer software.

The computer readable recording media can include a magnetic media such as a hard disc, a floppy disc, and a magnetic tape, an optical recording media such as a Compact Disc Read Only Memory (CD-ROM) and a Digital Versatile Disc (DVD), a magneto-optical media such as a floptical disk, and a hardware device, such as a Read Only Memory (ROM), a Random Access Memory (RAM), and a flash memory, specifically configured to store and execute program instructions. In addition, the program instructions can include high class language codes, which can be executed in a computer by using an interpreter, as well as machine codes made by a compiler. The aforementioned hardware device may be configured to operate as one or more software modules in order to perform the operation of the present disclosure, and vice versa.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for providing an image at an electronic device comprising:
    displaying an image contained in a file on a touch screen;
    detecting a user input on the displayed image; and
    in response to the user input:
        identifying image processing information contained in the file, the image processing information regarding a feedback to be output when the user input is detected on the displayed image, and
        outputting the feedback.

2. The method of claim 1, further comprising:
    executing an editing mode; and
    recording the image processing information a header of the file in the editing mode.

3. The method of claim 2, wherein executing the editing mode comprises:
    identifying a setting option;
    recording and storing the image processing information based on a predefined template when the setting option corresponds to a template mode; and
    recording and storing the image processing information based on a user's text input when the setting option corresponds to a text mode.

4. The method of claim 1, wherein the image comprises one image, or a combined image obtained by combining a plurality of images into one image.

5. The method of claim 1, wherein the image comprises at least one piece of image processing information in a header of the file thereof, and the image processing information is defined for an entire region or at least one partial region of the image according to a user's designation.

6. The method of claim 1, wherein the image processing information comprises typical image processing information automatically recorded when the image is created and user-based image processing information added by a user.

7. The method of claim 6, wherein identifying the image processing information comprises:
    identifying whether the image comprises the user-based image processing information, by parsing a header of the file.

8. The method of claim 7, wherein outputting the feedback comprises:
    outputting at least one of a visual feedback, an auditory feedback, or a tactile feedback in response to the user-based image processing information, when the image comprises the user-based image processing information.

9. The method of claim 7, wherein identifying the image processing information comprises:
    determining whether a user input method is set in the user-based image processing information,
    wherein the user input method comprises at least one of a touch based input, a hovering based input, an electronic device based input, and a voice based input.

10. The method of claim 9, further comprising:
    determining whether the user input corresponds to the user input method, when the user-based image processing information comprises the user input method.

11. The method of claim 1, wherein outputting the feedback comprises:
    outputting a same feed back or different feedbacks for each region in response to the user input for at least one image region designated in the image processing information.

12. The method of claim 6, wherein the user-based image processing information comprises one or more of information associated with executing a function of an application, information associated with an application, information on an effect, information on content reproduced according to execution of a player, information on a replaced image, information on an original image, information defining a user input method, and information on a region according to the user's settings.

13. An apparatus, comprising:
    at least one processor;
    a display configured to display an image;
    a touch sensor configured to receive a user input on the displayed image; and
    at least one memory storing a file containing the image and computer program instructions configured, working with the at least one processor, to cause the apparatus at least to:
        add image processing information regarding a feedback to be output into the file, and
        in response to the user input on the displayed image received from the touch sensor, output the feedback by referring the image processing information added to the file.

14. The apparatus of claim 13, wherein the computer program instructions are further configured, working with the at least one processor, to cause the apparatus to perform that the image processing information is recorded in a header of the file, and the image processing information is defined by a user in a template or text mode.

15. The apparatus of claim 13, wherein the computer program instructions are further configured, working with the at least one processor, to cause the apparatus to control at least one of a visual feedback, an auditory feedback, and a tactile feedback to correspond to the image processing information.

16. The apparatus of claim 13, wherein the computer program instructions are further configured, working with the at least one processor, to cause the apparatus to determine whether the user input is an effective input, with reference to the image processing information, and control the feedback through image processing responding to the user input based on the image processing information when it is determined that the user input is the valid input.

17. The apparatus of claim 13, wherein, when the image processing information comprises a user input method, the computer program instructions are further configured, working with the at least one processor, to cause the apparatus to determine whether the user input corresponds to the user input method, and cause that the same or different feedback is output for each region in response to the user input for at least one image region designated in the image processing information.

18. The apparatus of claim 13, wherein the image processing information comprises one or more of information associated with executing a function of an application, information associated with an application, information on an effect, information on content reproduced according to execution of a player, information on a replaced image, information on an original image, information defining a user input method, and information on a region according to the user's settings.

19. An apparatus, comprising:
at least one processor;
a display configured to display an image;
a touch sensor configured to receive a user input on the displayed image;
at least one memory storing a file containing the image and computer program instructions configured, working with the at least one processor, to cause the apparatus at least to:
detect a user input on the displayed image; and
in response to the user input:
identify image processing information contained in the file, the image processing information regarding a feedback to be output when the user input is detected on the displayed image, and
output the feedback.

20. The apparatus of claim 19, wherein the computer program instructions are further configured, working with the at least one processor, to cause the apparatus to:
record the image processing information into a header of the file,
determine whether the user input is an effective input, with reference to the image processing information, and
wherein the feedback is output when it is determined that the user input is the effective input.

* * * * *